United States Patent
Nohl et al.

(10) Patent No.: US 7,537,196 B2
(45) Date of Patent: May 26, 2009

(54) VALVE ASSEMBLY WITH OVERSTROKE DEVICE AND ASSOCIATED METHOD

(75) Inventors: John P. Nohl, Indianapolis, IN (US); Robin H. Willats, Columbus, IN (US)

(73) Assignee: EMCON Technologies LLC, Wilmington, DE (US)

(*) Notice: Subject to any disclaimer, the term of this patent is extended or adjusted under 35 U.S.C. 154(b) by 0 days.

(21) Appl. No.: 12/054,518

(22) Filed: Mar. 25, 2008

(65) Prior Publication Data

US 2008/0164433 A1      Jul. 10, 2008

Related U.S. Application Data

(62) Division of application No. 11/251,288, filed on Oct. 14, 2005, now Pat. No. 7,374,147.

(51) Int. Cl.
*F16K 1/22* (2006.01)

(52) U.S. Cl. ............... 251/129.04; 251/129.19; 251/287; 251/294; 251/305

(58) Field of Classification Search ............ 251/129.04, 251/129.19, 129.2, 286, 287, 288, 294, 305, 251/192
See application file for complete search history.

(56) References Cited

U.S. PATENT DOCUMENTS

| | | | |
|---|---|---|---|
| 2,753,148 A | 7/1956 | Oetiker | |
| 2,827,259 A | 3/1958 | Kindt | |
| 3,101,924 A | 8/1963 | Berck | |
| 3,514,227 A | 5/1970 | Rupp | |
| 3,762,683 A | 10/1973 | Sangl | |
| 3,954,250 A | 5/1976 | Grace | |
| 4,073,468 A * | 2/1978 | Erwin | 251/77 |
| 4,296,913 A * | 10/1981 | Hoyer | 251/77 |
| 4,317,419 A | 3/1982 | Spanel et al. | |
| 4,442,996 A * | 4/1984 | Erwin | 251/77 |
| 4,473,056 A | 9/1984 | Ishida et al. | |
| 4,474,537 A | 10/1984 | Dolz | |
| 4,610,393 A | 9/1986 | Rodriguez | |
| 4,794,314 A | 12/1988 | Janu et al. | |
| 4,841,844 A | 6/1989 | Tootle | |

(Continued)

FOREIGN PATENT DOCUMENTS

GB     2 101 715 A     1/1983

(Continued)

OTHER PUBLICATIONS

International search report from PCT/US06/39750 dated Jul. 27, 2007 (8 pages).

(Continued)

*Primary Examiner*—John Bastianelli
(74) *Attorney, Agent, or Firm*—Barnes & Thornburg LLP

(57) ABSTRACT

A valve assembly comprises a rotatable valve, an electrically operated actuator, and an overstroke device. The actuator comprises a component configured to move in a direction to an actuator position so as to cause corresponding rotation of the valve to a valve position in response to electrical operation of the actuator. The overstroke device is configured to enable the component to move in the direction beyond the actuator position to an overstroke position while the valve remains in the valve position in response to electrical operation of the actuator.

10 Claims, 5 Drawing Sheets

U.S. PATENT DOCUMENTS

| | | | |
|---|---|---|---|
| 4,880,207 A | 11/1989 | Matsumoto et al. |
| 5,096,156 A | 3/1992 | Wylie et al. |
| 5,117,869 A | 6/1992 | Kolchinsky |
| 5,160,002 A | 11/1992 | Suzuki |
| 5,161,494 A | 11/1992 | Brown, Jr. |
| 5,238,220 A | 8/1993 | Shell et al. |
| 5,263,684 A | 11/1993 | Mcguire |
| 5,351,935 A | 10/1994 | Miyoshi et al. |
| 5,533,707 A | 7/1996 | Beesley |
| 5,658,602 A | 8/1997 | Martin et al. |
| 5,762,044 A | 6/1998 | Hollister et al. |
| 5,878,715 A | 3/1999 | Hernandez et al. |
| 5,941,201 A | 8/1999 | Shimizu et al. |
| 5,997,181 A | 12/1999 | Stanley |
| 6,084,320 A | 7/2000 | Morita et al. |
| 6,153,951 A | 11/2000 | Morita et al. |
| 6,224,385 B1 | 5/2001 | Nitta et al. |
| 6,244,385 B1 | 6/2001 | Tsubata et al. |
| 6,262,498 B1 | 7/2001 | Leiber |
| 6,263,898 B1 | 7/2001 | Vanderveen et al. |
| 6,341,767 B1 | 1/2002 | Seale et al. |
| 6,343,615 B1 | 2/2002 | Miller et al. |
| 6,343,746 B2 | 2/2002 | Chamot et al. |
| 6,516,758 B1 | 2/2003 | Leiber |
| 6,612,542 B2 | 9/2003 | Hirota et al. |
| 6,641,111 B2 | 11/2003 | Lorenz et al. |
| 6,742,716 B1 | 6/2004 | Duprez et al. |
| 6,764,020 B1 | 7/2004 | Zhao et al. |

FOREIGN PATENT DOCUMENTS

WO     2007/047316 A2     4/2007

OTHER PUBLICATIONS

Three drawings of valve layout (2 pages) (Nov. 30, 2004).

\* cited by examiner

US 7,537,196 B2

VALVE ASSEMBLY WITH OVERSTROKE DEVICE AND ASSOCIATED METHOD

CROSS-REFERENCES TO RELATED APPLICATIONS

This application is a divisional of prior application Ser. No. 11/251,288, filed Oct. 14, 2005, the disclosure of which is hereby incorporated by reference.

FIELD OF THE DISCLOSURE

The present disclosure relates to a valve assembly and method which are particularly useful in engine exhaust system applications.

BACKGROUND OF THE DISCLOSURE

Valves are used for many purposes. For example, valves have been used in engine exhaust system applications for flow control and acoustical reasons, to name just a few.

SUMMARY OF THE DISCLOSURE

According to an aspect of the present disclosure, there is provided a valve assembly. The valve assembly comprises a rotatable valve, an electrically operated actuator, and an overstroke device. The actuator comprises a component configured to move in a direction to an actuator position so as to cause corresponding rotation of the valve to a valve position in response to electrical operation of the actuator. The overstroke device is configured to enable the component to move in the direction beyond the actuator position to an overstroke position while the valve remains in the valve position in response to electrical operation of the actuator. By allowing the component to overstroke in this way, the electrical current draw by the actuator can be reduced, thereby saving on power consumption and enhancing the useful life of the actuator. An associated method is disclosed.

The valve assembly and method are particularly useful in engine exhaust system applications. They are believed to be useful in other applications as well.

The above and other features of the present disclosure will become apparent from the following description and the attached drawings.

DETAILED DESCRIPTION OF THE DRAWINGS

Figure 1:
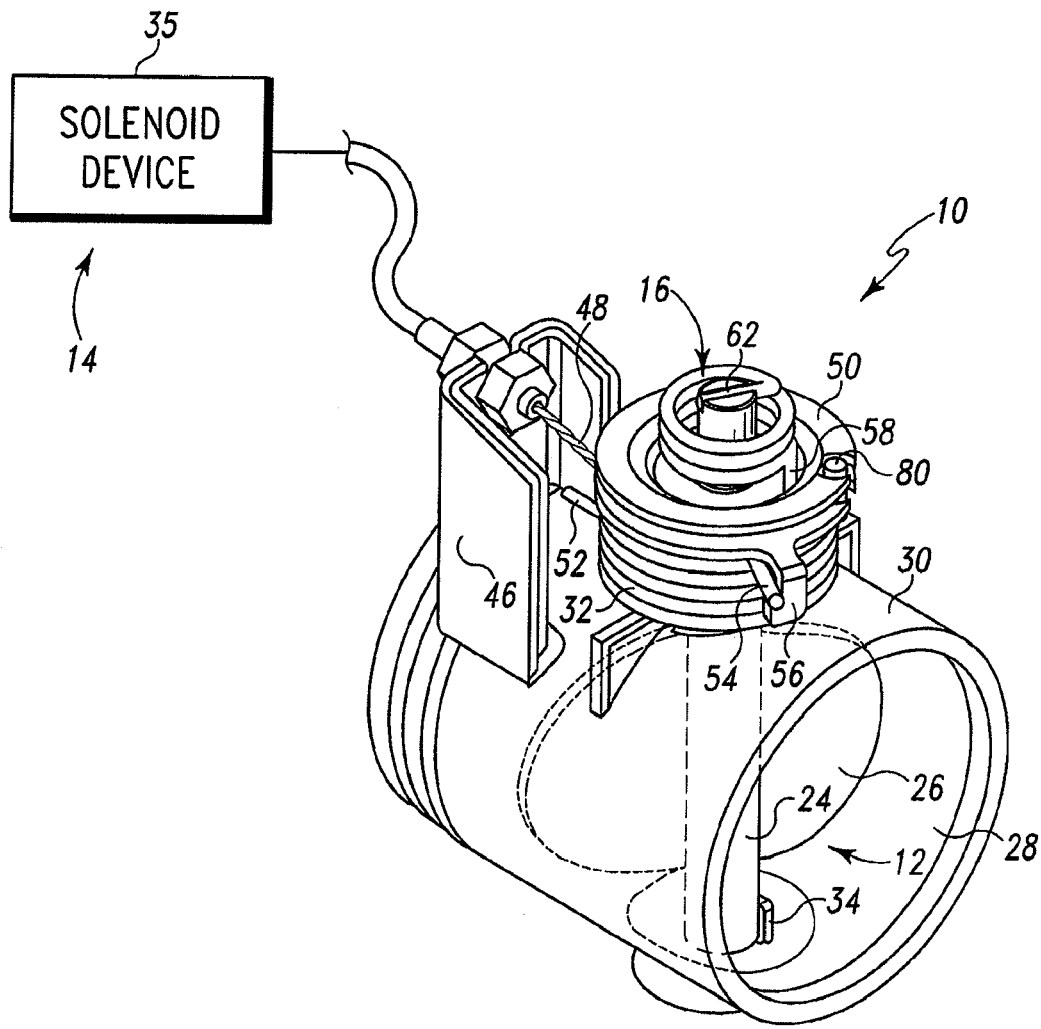
FIG. 1 is a perspective view showing a valve assembly with a closed flapper.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

In FIG. 1, there is shown a valve assembly 10. The valve assembly 10 comprises a rotatable valve 12, an electrically operated actuator 14, and an overstroke device 16. The actuator 14 comprises a component 18 configured to move in a direction 22 to an actuator position so as to cause corresponding rotation of the valve 12 to a valve position in response to electrical operation of the actuator 14 (see FIG. 4). The overstroke device 16 is configured to enable the component 18 to move in the direction 22 beyond the actuator position to an overstroke position while the valve 12 remains in the valve position in response to electrical operation of the actuator 14 (see FIG. 6). By allowing the component 18 to overstroke in this way, the electrical current draw by the actuator 14 can be reduced, thereby saving on power consumption and enhancing the useful life of the actuator 14.

Figure 3:
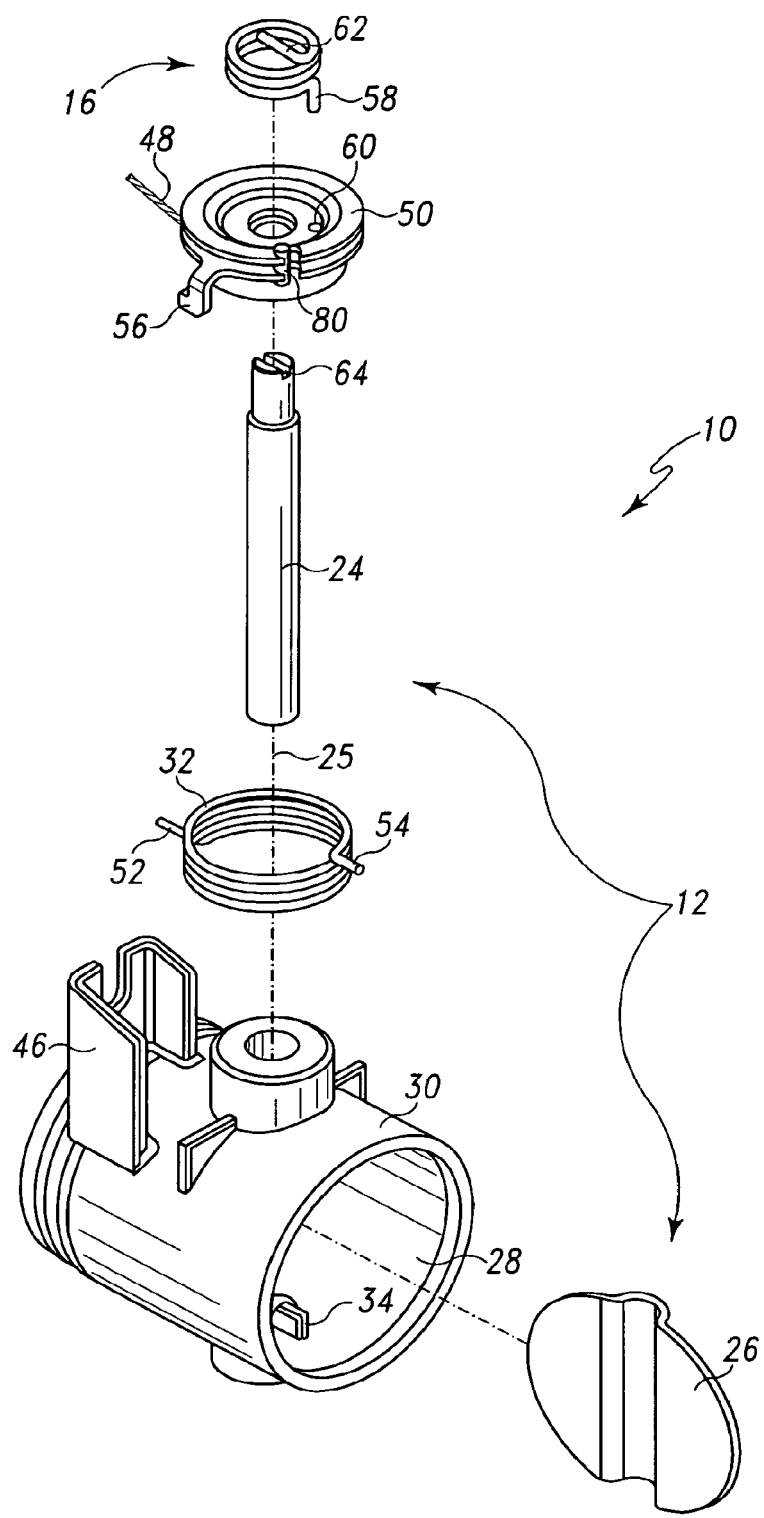
FIG. 3 is an exploded perspective view showing components of the valve assembly.
Figure 4:
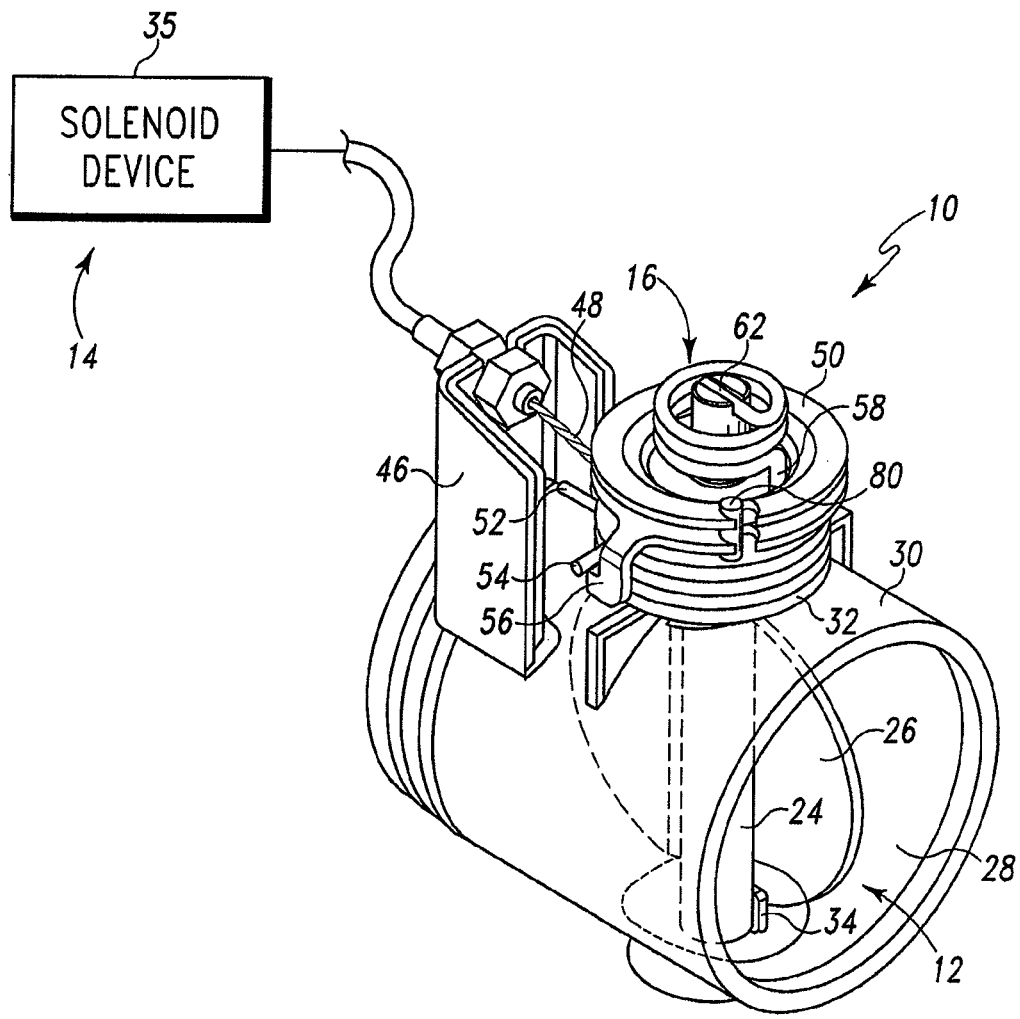
FIG. 4 is a perspective view showing the valve assembly with an open flapper.
Figure 6:
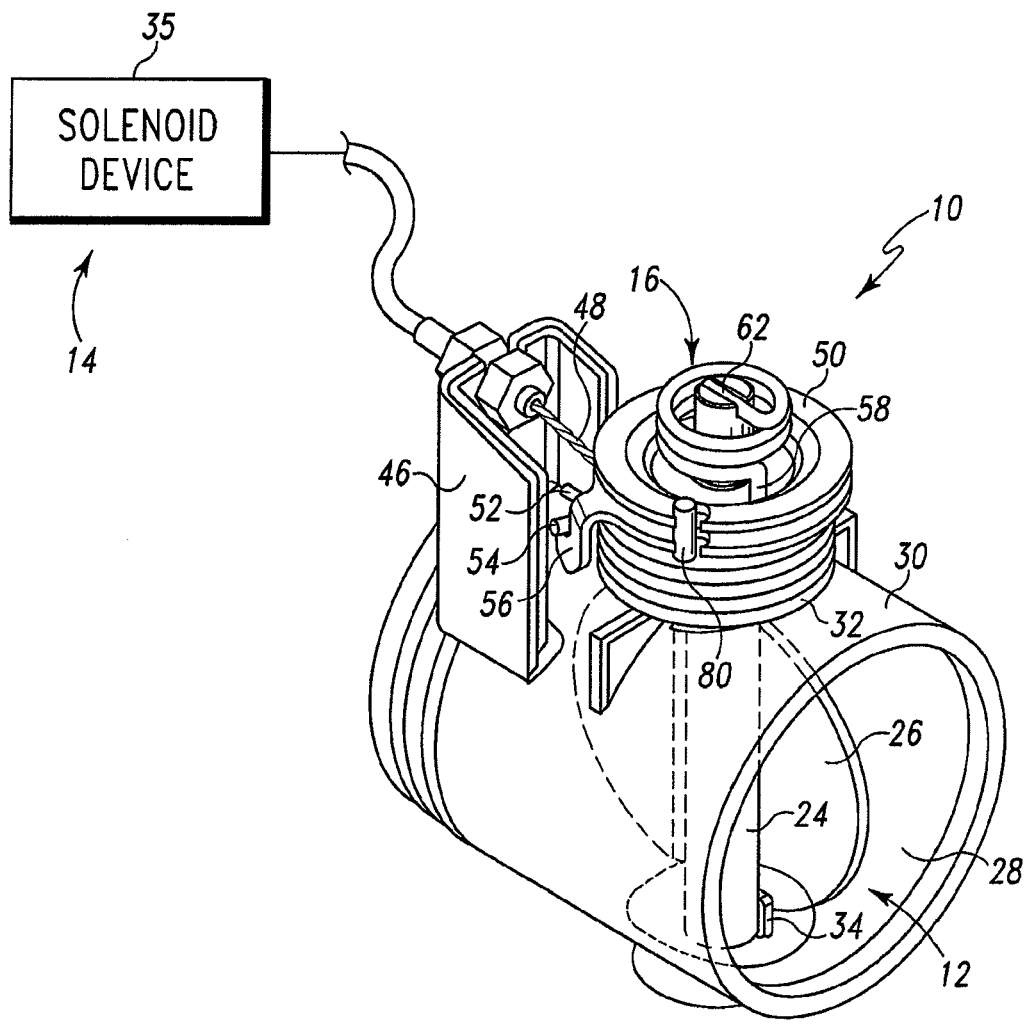
FIG. 6 is a perspective view showing the valve assembly with an overstroked actuator.

The valve 12 is rotatable between a closed position shown in FIG. 1 and an opened position shown in FIGS. 4 and 6. Rotation of a shaft 24 about an axis 25 (see FIG. 3) causes a flapper 26 secured thereto and positioned in a passageway 28 (e.g., exhaust gas passageway in exhaust applications) of a body 30 to rotate with the shaft 24 about the axis 25 through an angle (e.g., about 60°) between the closed and opened positions. The valve 12 is biased normally toward the closed position by a torsion spring 32 that acts through the actuator 14 and the overstroke device 16, as discussed in more detail below. Contact between the flapper 26 and a valve stop 34 establishes the valve 12 in the opened position. It is contemplated that the valve 12 may be biased normally toward the opened position.

The actuator 14 is operated by electrical power provided by an electrical power source (not shown). The actuator 14 may include, but is not limited to, a linear solenoid device, a rotary solenoid device, and/or a geared DC motor, to name just a few. By way of example, the actuator 14 is discussed and illustrated herein as having a linear solenoid device 35. In such an exemplary case, a plunger of the linear solenoid device 35 acts as the component 18 of the actuator 14, although it is to be understood that such a plunger is but one non-limiting example of the component.

Figure 2:
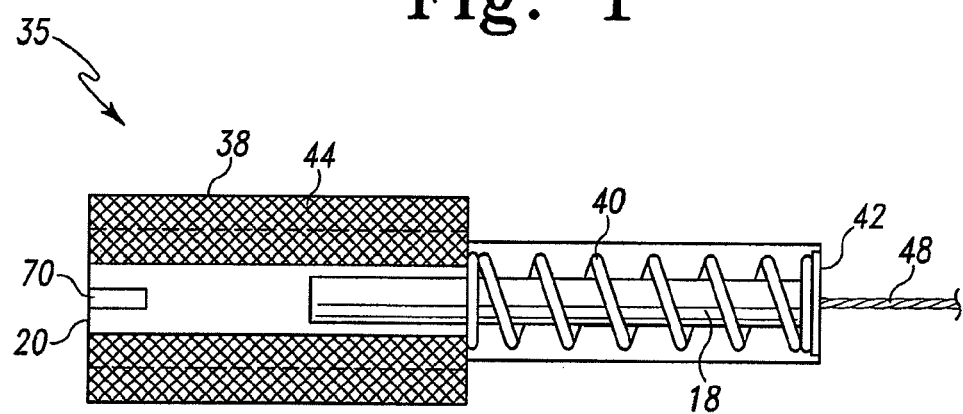
FIG. 2 is a sectional view showing a solenoid device of the valve assembly in a configuration corresponding to the closed arrangement of FIG. 1.

As shown in FIG. 2, the component 18 of the linear solenoid device 35 is mounted in a housing 38 for linear movement therein. Normally, the component 18 is biased by a spring 40 to a first position against a stop 42. The component 18 is positioned within an electrically conducting coil 44 which is configured to cause the component 18 to move toward an actuator stop 20 when the coil 44 is energized.

Referring back to FIG. 1, a flexible line 48 (e.g., a cable) of the actuator 14 contained in a sheath secured to a mounting plate 46 interconnects the component 18 and a pulley 50 of the actuator 14. The line 48 is secured to the pulley by use of a lug 80 swaged to or otherwise secured to an end portion of the line 48. The pulley 50 surrounds and is rotatable relative to the shaft 24 and rests on the spring 32. A first end portion 52 of the spring 32 presses against the mounting plate 46 and a second end portion 54 of the spring 32 presses against an arm 56 of the pulley 50 to bias the pulley 50 to the position shown in FIG. 1.

The overstroke device 16 is configured, for example, as a torsion spring interconnecting the pulley 50 and the shaft 24. A first end portion 58 of the device 16 is secured to the pulley 50 by receipt of the end portion 58 in an aperture 60 (see FIG. 3). A second end portion 58 of the device 16 is secured to the shaft 24 by receipt of the end portion 58 in a slot 62 formed in an end portion of the shaft 24 surrounded by the device 16. As such, the pulley 50 is secured to and positioned between the device 16 and the spring 32.

The overstroke device 16 is more stiff than the spring 32. In the case where the device 16 is a torsion spring, this means that its spring constant is greater than the spring constant of the spring 32, the purpose of which is discussed in more detail below.

Figure 5:
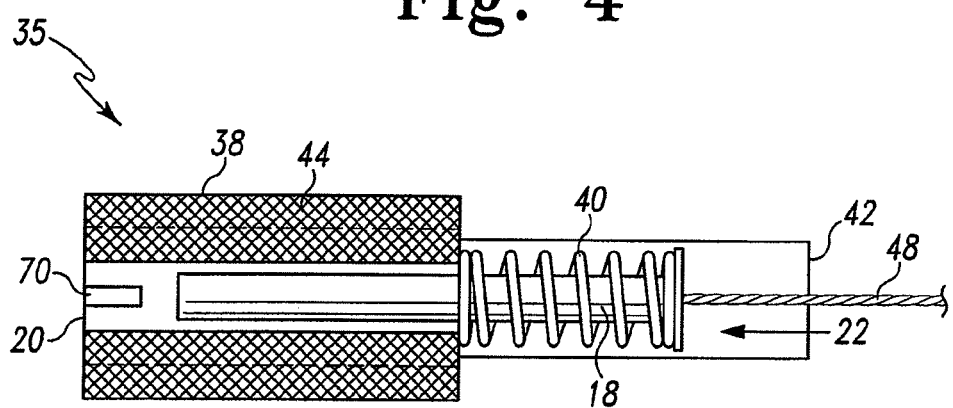
FIG. 5 is a sectional view showing the solenoid device in a configuration corresponding to the open arrangement of FIG. 4.

Referring to FIGS. 4 and 5, when the coil 44 is electrically energized, the component 18 is caused to move in the direction 22 along a path away from the stop 42 toward the stop 20. Such motion causes the flapper 26 to rotate away from its closed position toward its opened position. As such, the path of the component 18 has a valve actuation zone for actuating the valve 12. The valve actuation zone is defined between a first end actuator position in which the component contacts the stop 42, as shown in FIG. 2, to an intermediate actuator position shown in FIG. 5. When the component 18 reaches the intermediate actuator position, the flapper 26 is caused to make initial contact with the valve stop 34. In the valve actuation zone, the component 18 acts through the line 48, the pulley 50, the overstroke device 16, and the shaft 24 to rotate the flapper 26.

Further, in the valve actuation zone, the spring 32 is loaded due to rotation of the pulley 50 but the overstroke device 16 is not loaded. This is because the overstroke device 16 is more stiff than the spring 32. As such, in the valve actuation zone, the end portions 58 and 62 of the overstroke device 16 do not move relative to one another so that rotation of the pulley 50 causes corresponding rotation of the shaft 24 and flapper 26.

Figure 7:
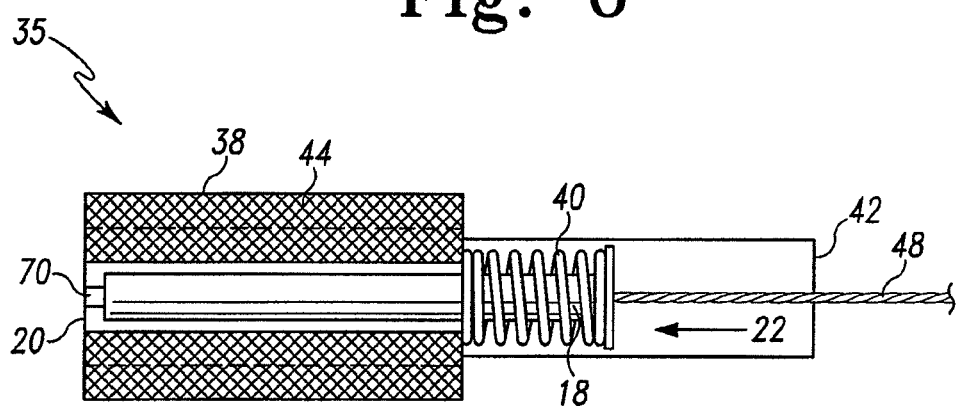
FIG. 7 is a sectional view showing the solenoid device overstroked.

Referring to FIGS. 6 and 7, when the flapper 26 contacts the valve stop 34, the shaft 24 and flapper 26 are blocked from further rotation with the pulley 50. In other words, as the component 18 continues to move in the direction 22 beyond the intermediate actuator position toward the stop 20 due to energization of the coil 44, the shaft 24 and flapper 26 are unable to rotate. Indeed, the overstroke device 16 enables the component 18 to move in the direction 22 beyond the intermediate actuator position to the overstroke position (located between the intermediate actuator position and a second end actuator position contacting the stop 20) while the shaft 24 and the flapper 26 remain in the valve position established by the valve stop 34. The overstroke device 16 does so by allowing itself to be deformed and thus loaded due to rotation of the pulley 50 relative to the shaft 24. Such deformity occurs upon movement of the end portion 58 relative to the end portion 62. The path of the component 18 thus has an overstroke zone defined between the intermediate actuator position and the second end actuator position.

When the component 18 reaches the overstroke position, electrical current draw by the solenoid device 35 can be reduced. This may be achieved in a variety of ways depending on the type of solenoid device 35 used. For example, the stop 20 may include an electrical switch 70 to be actuated (e.g., closed) by the component 18 when the component 18 reaches the overstroke position which, in this example, is the second end actuator position. The solenoid device 35 may be configured such that actuation of the switch 70 causes electrical current draw by the solenoid device 35 to be reduced to some non-zero value. Exemplarily, the coil 44 may be a single coil or comprise two coils (as suggested by the horizontal dashed line through the coil 44), a pull coil and a hold coil. In the case of two coils, the pull coil may be used to move the component 18 to actuate the switch 70 causing the hold coil to take over to hold the component 18 in the overstroke position with a lower electrical current than needed by the pull coil. In another example, the switch 70 may be eliminated in which case the hold coil may take over from the pull coil to hold the component 18 in the overstroke position (which may be spaced apart from the stop 20) upon elapse of a predetermined period of time in the overstroke position, allowing reduction of the electrical current draw. The device 35 is thus able to reduce its draw of electrical current (e.g., a reduction of about 97.5%) when the component 18 assumes the overstroke position, thereby saving on power consumption and enhancing the useful life of the device 35.

When the coil 44 is de-energized (i.e., no electrical current supplied to the coil 44), the components of the valve assembly 10 return to their original state shown in FIGS. 1 and 2. In particular, the spring 40 moves the component 18 in a direction opposite to direction 22 away from the stop 20 toward the stop 42 back to the first actuator end position. The spring 32 is then able to act through the pulley 50, the overstroke device 16, and the shaft 24 to rotate the flapper 26 away from the valve stop 34 to the closed position.

The solenoid device 35 may take a variety of forms. For example, the solenoid device 35 may be embodied as any solenoid device of the ELECTROFORCE™ 1500 Series, 1750 Series, or 2000 Series available from Woodward Governor Company located in Niles, Ill.

The valve assembly 10 may be used in a variety of applications such as engine exhaust system applications. Two such applications are shown in FIGS. 8 and 9.

Figure 8:
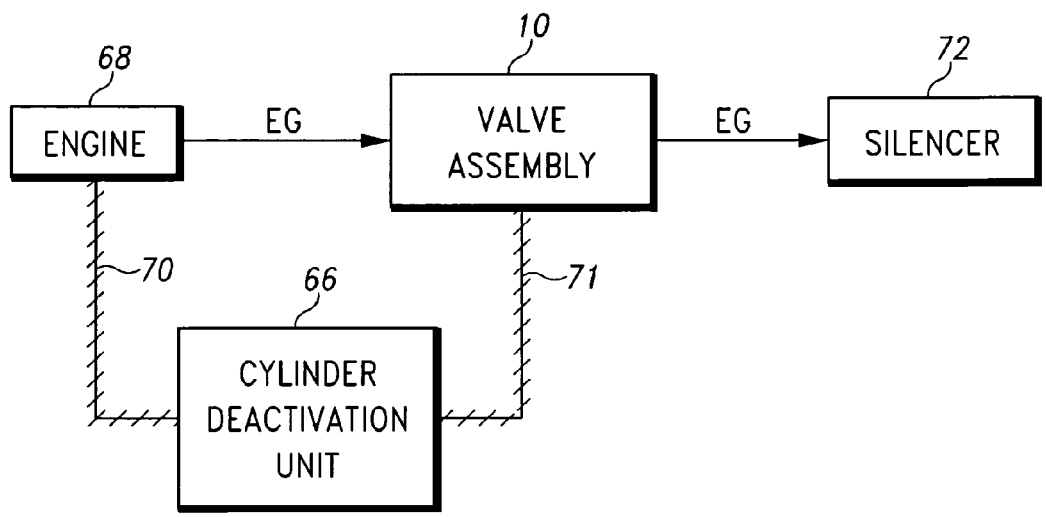
FIG. 8 is a simplified block diagram showing use of the valve assembly in a cylinder deactivation scheme.

Referring to FIG. 8, the valve assembly 10 may be used in a cylinder deactivation scheme. In such a scheme, a cylinder deactivation unit 66 electrically coupled to an engine 68 via an electrical line 70 sends electrical signals over an electrical line 71 to the valve assembly 10 to move the valve 12 to a selected position in response to activation or deactivation of a number of cylinders of the engine 68. Such adjustment of the valve 12 controls flow of exhaust gas through a silencer 72 (e.g., muffler, resonator) in order to achieve a desired sound quality output when the engine 68 is operating in different modes having different numbers of operational engine cylinders. Use of the valve assembly 10 in the cylinder deactivation scheme would promote reduction of the overall power requirements of the scheme.

Figure 9:
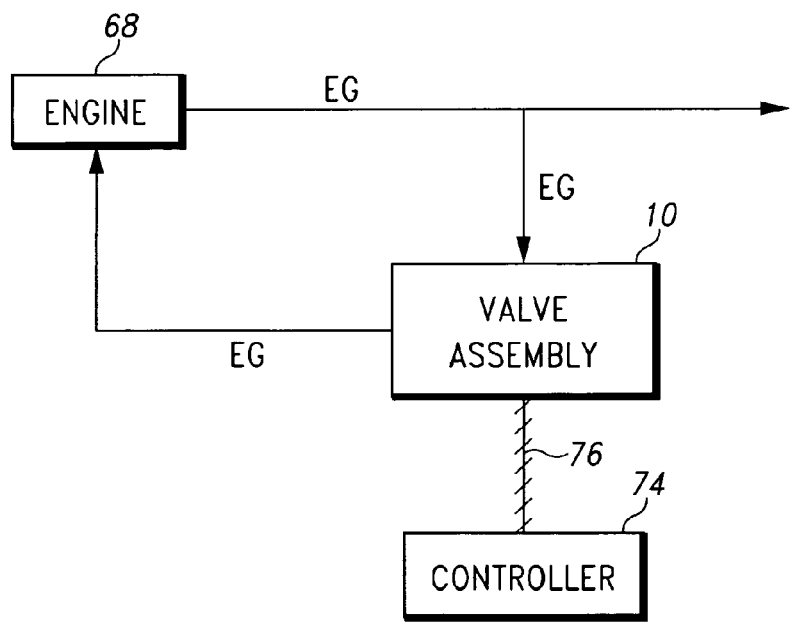
FIG. 9 is a simplified block diagram showing use of the valve assembly in an exhaust gas recirculation scheme.

Referring to FIG. 9, the valve assembly 10 may be used in an exhaust gas recirculation (EGR) scheme. In such a scheme, the valve assembly 10 may function as an EGR valve under the control of a controller 74 via an electrical line 76 to control recirculation of exhaust gas to the engine 68. Use of the valve assembly 10 in the EGR scheme would promote reduction of the power requirements of the scheme.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

What is claimed is:

1. A valve assembly, comprising
   a rotatable valve,
   an electrically operated actuator comprising a component configured to move in a direction to an actuator position so as to cause corresponding rotation of the valve to a valve position in response to electrical operation of the actuator,
   a torsion spring to bias the valve away from the valve position, and
   an overstroke device configured to enable the component to move in the direction beyond the actuator position to an overstroke position while the valve remains in the valve position in response to electrical operation of the actuator.

2. The valve assembly of claim 1, wherein the valve is positioned in an exhaust gas passageway associated with an engine.

3. The valve assembly of claim 1, wherein the overstroke device comprises a spring interconnecting the valve and the actuator.

4. The valve assembly of claim 1, wherein the overstroke device comprises a second torsion spring interconnecting the valve and the actuator.

5. The valve assembly of claim 4, wherein
   the valve comprises a rotatable shaft,
   the actuator comprises a pulley, and
   the second torsion spring interconnects the shaft and the pulley.

6. The valve assembly of claim 5, wherein the second torsion spring comprises a first end portion secured to the shaft and a second end portion secured to the pulley.

7. The valve assembly of claim 4, wherein the second torsion spring is more stiff than the torsion spring to bias the valve away from the valve position.

8. The valve assembly of claim 1, wherein the actuator reduces its draw of electrical current as a result of the component assuming the overstroke position.

9. The valve assembly of claim 1, wherein
   the overstroke device interconnects the actuator and the valve, and
   the component is configured to move along a path comprising a valve actuation zone in which the component acts through the overstroke device to rotate the valve and an overstroke zone in which the overstroke device enables the component to move to the overstroke position while the valve remains in the valve position.

10. The valve assembly of claim 9, wherein
    the valve comprises a rotatable flapper and a rotatable shaft secured to the flapper to rotate the flapper into contact with a valve stop to establish the valve in the valve position,
    the component comprises a plunger configured to move along a linear path comprising the valve actuation zone and the overstroke zone,
    the actuator comprises a pulley secured to the plunger for movement therewith,
    the overstroke device comprises a torsion spring interconnecting the pulley and the shaft, and
    the second torsion spring transmits motion of the plunger into rotation of the shaft during movement of the plunger in the valve actuation zone but does not transmit motion of the plunger into rotation of the shaft during movement of the plunger in the overstroke zone.

* * * * *